(12) United States Patent
Kazuyoshi

(10) Patent No.: US 7,760,312 B2
(45) Date of Patent: Jul. 20, 2010

(54) LIQUID CRYSTAL DISPLAY WITH A VIEWING ANGLE CONTROL ELECTRODE AND METHOD OF MANUFACTURING THE SAME

(75) Inventor: Nagayama Kazuyoshi, Kanagawa-ken (JP)

(73) Assignee: LG. Display Co., Ltd., Seoul (KR)

( * ) Notice: Subject to any disclaimer, the term of this patent is extended or adjusted under 35 U.S.C. 154(b) by 569 days.

(21) Appl. No.: 11/647,539

(22) Filed: Dec. 27, 2006

(65) Prior Publication Data

US 2007/0165168 A1 Jul. 19, 2007

(30) Foreign Application Priority Data

Dec. 28, 2005 (JP) .......................... P2005-379217

(51) Int. Cl.
*G02F 1/1343* (2006.01)
*G02F 1/1337* (2006.01)

(52) U.S. Cl. .................. 349/144; 349/141; 349/142; 349/143; 349/128; 349/129; 349/130; 349/132

(58) Field of Classification Search ......... 349/141–144, 349/128–130, 132–135
See application file for complete search history.

*Primary Examiner*—Hoan C Nguyen
(74) *Attorney, Agent, or Firm*—Brinks Hofer Gilson & Lione

(57) ABSTRACT

A liquid crystal display having a viewing angle which is controllable in side directions without forming a white subpixel is disclosed. The vertical alignment type liquid crystal display has a display screen including a plurality of pixels. Each pixel includes a display control region in which an alignment of liquid crystal molecules is controlled such that the liquid crystal molecules are disposed in an inclined orientation with respect to the display screen when a control voltage is applied, and a viewing angle control region in which the alignment of the liquid crystal molecules is controlled such that the liquid crystal molecules are disposed in a first side orientation or in a second side orientation when a control voltage is applied. The control voltage is applied through a viewing angle control line separated from the display control region.

9 Claims, 18 Drawing Sheets

LIQUID CRYSTAL DISPLAY WITH A VIEWING ANGLE CONTROL ELECTRODE AND METHOD OF MANUFACTURING THE SAME

This application claims the benefit of Japanese Patent Application No. 2005-37921, filed on Dec. 28, 2005, which is hereby incorporated by reference as if fully set forth herein.

TECHNICAL FIELD

The present disclosure relates to a liquid crystal display having a viewing angle which is controllable and a method of manufacturing the same.

BACKGROUND

Liquid crystal displays, in particular liquid crystal displays adopting thin film transistors (TFTs), have been widely used in various applications from mobile phones to large-sized televisions.

One application is a personal display device, which has a display screen generally intended to be seen by a user of the personal display device but not by other persons who may view the device from the side.

Preferably, the personal display device is constructed such that the display screen of the device can be viewed by a large number of persons or the display screen can be viewed exclusively by only one individual, as occasion demands.

FIG. 11 is a view illustrating a conventional liquid crystal display 100 having a secret mode 130.

There has been proposed a display 100 having the secret mode 130 shown in FIGS. 11A-11C. (for example, Japanese Unexamined Publication No. 5-72529).

Referring to FIG. 11A, a backlight 120 for emitting light to a liquid crystal panel 100 from the rear side has high directionality.

Between the common liquid crystal panel 100 and the directional backlight 120 is disposed another liquid crystal panel 110 for switching between a scattered state 140 and an unscattered state 130, for example, a polymer-type liquid crystal panel (a scattering-unscattering switching panel).

Referring to FIG. 11B, when the scattering-unscattering switching panel 110 is in an unscattered state 130, light from the backlight 120 is emitted to only the front, and therefore, it is not possible to see an inclined display.

On the other hand, referring to FIG. 11C, when the scattering-unscattering switching panel 110 is in a scattered state 140, light from the backlight 120 is emitted in an inclined direction, and therefore, it is possible to see an inclined display. Consequently, a large number of persons can view the display.

In this case, it is necessary to manufacture a special liquid crystal panel 110 in addition to the common liquid crystal panel 100, and therefore, the manufacturing costs are increased.

In order to solve this problem, a method using a vertical alignment type liquid crystal display has been proposed.

Hereinafter, the fundamental principle thereof will be described in detail with reference to FIGS. 12A to 15.

FIGS. 12A and 12B are views illustrating the shape of a liquid crystal molecule 200 when viewing the vertical alignment type liquid crystal display from the front (z-direction) when no voltage is applied (FIG. 12A) and when a voltage is applied (FIG. 12B).

As shown in FIG. 12A, the liquid crystal molecule 200 is oriented vertically (along the z-direction) when no voltage is applied. When the voltage is applied as shown in FIG. 12B, the liquid crystal molecule 200 is inclined upward.

A polarizer and an analyzer are directed to their absorption axes 210, 220, respectively.

FIG. 12A illustrates a case in which the vertically oriented liquid crystal panel is viewed from the front when the voltage is not applied. Double refraction of the liquid crystal molecule 200 does not occur, and light leakage may be avoided.

On the other hand, FIG. 12B illustrates a case in which the vertically oriented liquid crystal panel is viewed from the front when the voltage is applied. The optical axis of the liquid crystal molecule 200 may be parallel with the absorption axis of the polarizer 210. Double refraction of the liquid crystal molecule may not occur, and light leakage may be avoided.

FIGS. 13A and 13B are views illustrating the shape of a liquid crystal molecule 200 when viewing the vertical alignment type liquid crystal display from the side (at an angle to the front) of the liquid crystal display.

When the voltage is not applied, as shown in FIG. 13A, the axis of the liquid crystal molecule 200 is parallel with the absorption axis of the analyzer 220, and therefore, light leakage may be avoided.

On the other hand, when the voltage is applied, as shown in FIG. 13B, the axis of the liquid crystal molecule 200 may be offset from the axis of the polarizer 210 or the axis of the analyzer 220. Consequently, double refraction of the liquid crystal molecule 200 may occur, and light may leak.

When light leakage occurs, the display contrast is lowered to the extreme in the side direction. As a result, it is not possible to recognize what is written even when the display is seen from the side. Consequently, it is possible to control the confidentiality of the display by using this light leakage phenomenon.

FIG. 14 is a view illustrating a specific construction for controlling the confidentiality of the display.

Referring to FIG. 14, a single pixel 300 includes sub-pixels of red 310, green 320 and blue 330 (RGB) and a sub-pixel of white 340 (W).

FIG. 15 is a view illustrating the arrangement of liquid crystal molecules 200 within the respective sub-pixels shown in FIG. 14. As shown in FIG. 15, the orientation of the liquid crystal molecules 200 in the white sub-pixel 340 is quite different from the orientation of the liquid crystal molecules in the RGB sub-pixels 310, 320, 330. Specifically, the liquid crystal molecules 200 are oriented upward and downward in the white sub-pixel 340.

Consequently, when the voltage is not applied to the white sub-pixel 340, the white sub-pixel 340 does not contribute to the display, and therefore, a normal display can be realized.

On the other hand, when the voltage is applied to the white sub-pixel 340, the white display is revealed at the front in the horizontal direction. As a result, the contrast of the display is lowered in a horizontal viewing angle orientation, and therefore, it is difficult for other people to view the display.

Hereinafter, the display control in the conventional vertical alignment type liquid crystal display will be described.

FIG. 16 is a plan view illustrating an enlarged pixel 405 of the conventional vertical alignment type liquid crystal display. A common line 430, a signal line 435, and a gate line 440 are also shown. And, FIG. 17 is a sectional view illustrating the enlarged pixel of the conventional vertical alignment type liquid crystal display. In addition, FIGS. 18A and 18B are views illustrating the operation of liquid crystal molecules 200 due to the application of voltage in the conventional vertical alignment type liquid crystal display.

A generally "<"-shaped common electrode 400 for prescribing the liquid crystal inclination direction is formed on a transparent electrode 410 at a color filter 420 side (see FIGS. 16 and 17).

When the voltage is not applied, the liquid crystal molecules 200 are oriented in an upward direction, as shown in FIG. 18A.

When the voltage is applied, on the other hand, the liquid crystal molecules 200 are oriented in the direction determined by the inclined electric field of the common electrode 400, i.e., the direction perpendicular to the spreading direction of the common electrode 400, as shown in FIG. 18B. As a result, a liquid crystal display having a good viewing angle may be realized.

However, the conventional liquid crystal display has the following problems.

First, the conventional liquid crystal display is constructed such that the white sub-pixel is formed; consequently, a white resin must be formed, and the driving operation of the white sub-pixel is different from the conventional art.

Second, the contrast may be lowered in the horizontal orientation, but the contrast may not be lowered in the vertical orientation.

SUMMARY

Accordingly, the present disclosure is directed to a liquid crystal display and a method of manufacturing the same that may substantially obviate one or more problems due to limitations and disadvantages of the related art.

Described herein is a liquid crystal display having a viewing angle which may be controlled in the side direction of the display without forming a white sub-pixel and a method of manufacturing the same.

As embodied and broadly described herein, a vertical alignment type liquid crystal display has a display screen including a plurality of pixels, and each pixel comprises a display control region and a viewing angle control region.

According to one embodiment, the display control region, which includes a pixel electrode, is a region in which an alignment of the liquid crystal molecules is controlled such that the liquid crystal molecules are disposed in an inclined orientation with respect to the display screen when a control voltage is applied. The viewing angle control region includes a viewing angle control electrode and is a region in which the alignment of the liquid crystal molecules is controlled such that the liquid crystal molecules are oriented in a first side orientation parallel to the display screen or in a second side orientation parallel to the display screen when the control voltage is applied. The control voltage is applied to the display control region and to the viewing angle control region through a common line.

According to another embodiment, the display control region includes a pixel electrode and a plurality of "<"-shaped banks or slits, and the viewing angle control region includes a viewing angle control electrode and a plurality of rectangular banks or slits disposed in one of a direction parallel to a common line and a direction perpendicular to the common line. A control voltage is applied to the display control region and to the viewing angle control region through the common line.

In another aspect, a method of manufacturing a liquid crystal display includes a first process of forming a transparent common electrode at a predetermined position on a substrate, a second process of forming a gate electrode, a common line, and a data pad on the substrate, a third process of forming a gate insulation film and forming a source electrode and a drain electrode on the gate electrode, a fourth process of forming a passivation layer on the front of the substrate and forming contact holes, and a fifth process of forming a transparent pixel electrode in a display control region in which an alignment of liquid crystal molecules is controlled such that the liquid crystal molecules are disposed in an inclined orientation with respect to the substrate, and forming a transparent viewing angle control electrode in a viewing angle control region in which the alignment of the liquid crystal molecules is controlled such that the liquid crystal molecules are disposed in a first side orientation parallel to the substrate or in a second side orientation parallel to the substrate, wherein a control voltage is applied to the display control region and the viewing angle control region through a common line.

It is to be understood that both the foregoing general description and the following detailed description of the present invention are exemplary and explanatory and are intended to provide further explanation of the invention as claimed.

DETAILED DESCRIPTION

Reference will now be made in detail to various preferred embodiments, examples of which are illustrated in the accompanying drawings. Wherever possible, the same reference numbers will be used throughout the drawings to refer to the same or like parts.

Figure 1:
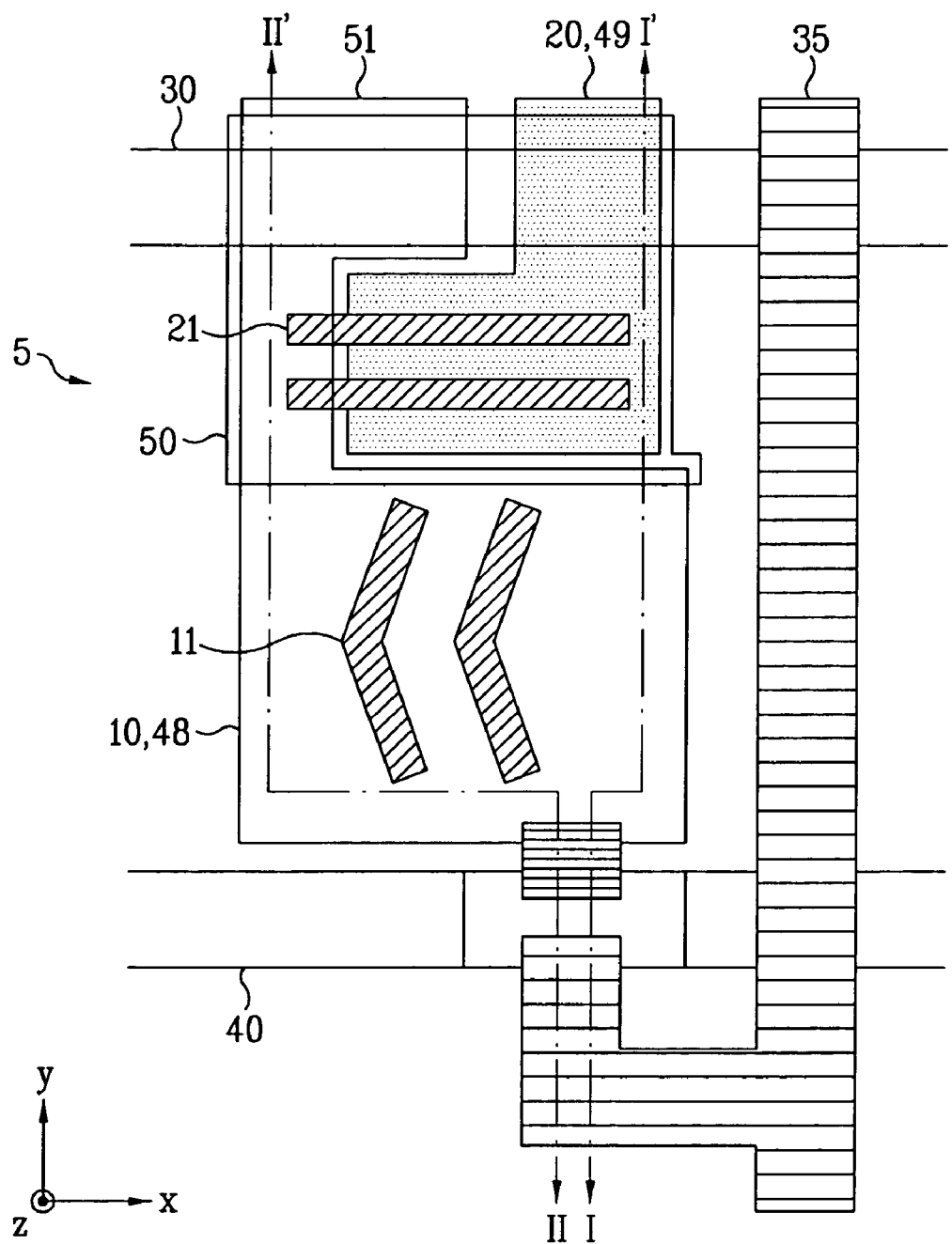
FIG. 1 is a plan view illustrating an enlarged pixel of a liquid crystal display according to a first embodiment.

FIG. 1 is a plan view illustrating an enlarged pixel 5 of a liquid crystal display according to a first embodiment. As shown in FIG. 1, a pixel 5 includes a display control region 10 and a viewing angle control region 20. A common line 30, a signal line 35, a transparent electrode 50, a load electrode 51, and a gate line 40 are also shown.

The display control region 10 includes a pixel electrode 48 and is a region in which an orientation of liquid crystal molecules is controlled such that the liquid crystal molecules are inclined with respect to a substrate of the display when a control voltage is applied. The display control region 10 includes "<"-shaped banks (or slits) 11.

On the other hand, the viewing angle control region 20 includes a viewing angle control electrode 49 and is a region in which an orientation of the liquid crystal molecules is controlled such that the liquid crystal molecules are disposed in a vertical orientation (y-direction) or in a horizontal orientation (x-direction) when a control voltage is applied. The control voltage is applied to the viewing angle control region 20 and display control region 10 through the common line 30. As shown in FIG. 1, banks (or slits) 21 are formed in the viewing angle control region 20 in the horizontal orientation (x-direction). The banks (or slits) are formed on at least a lower substrate and an upper substrate.

The horizontal and vertical orientations lie perpendicular to the viewing direction (z-direction) and parallel to the substrate. As shown in FIG. 1, the x-direction is parallel to the common line 30, and the y-direction is perpendicular to the common line 30. The horizontal orientation may be considered a first side orientation and the vertical orientation may be considered a second side orientation.

Figure 2:
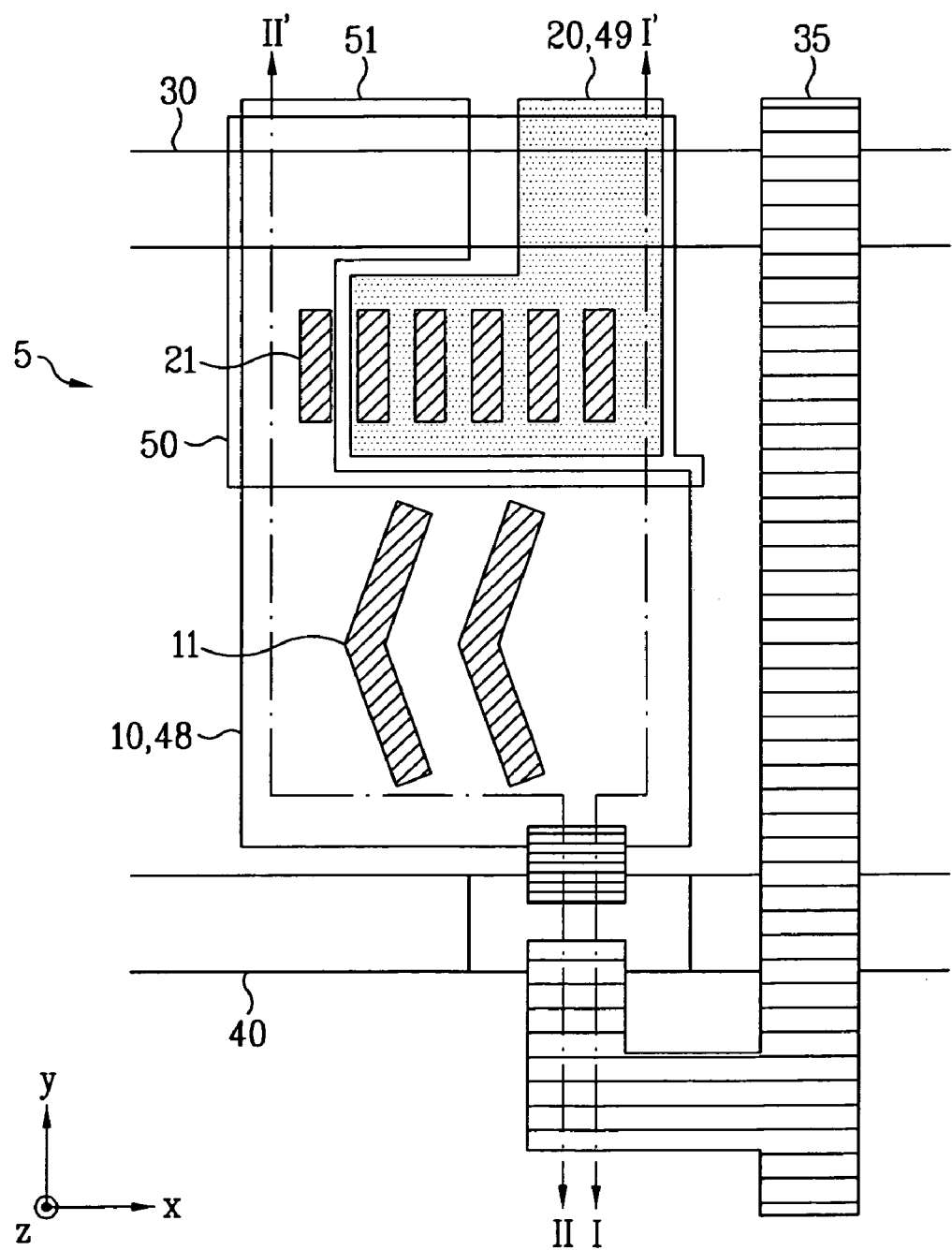
FIG. 2 is another plan view illustrating the enlarged pixel of the liquid crystal display according to the first embodiment.

FIG. 2 is another plan view illustrating the enlarged pixel 5 of the liquid crystal display according to the first embodiment. As shown in FIG. 2, the banks 21 are formed in the viewing angle control region 20 in the vertical direction (y-direction).

Hereinafter, a part including pixels 5 having the viewing angle control region 20 in which the banks 21 are arranged in the horizontal direction as shown in FIG. 1 will be referred to as an "A pattern."

Similarly, a part including pixels 5 having the viewing angle control region 20 in which the banks 21 are arranged in the vertical direction as shown in FIG. 2 will be referred to as a "B pattern."

For example, a display screen formed by approximately 1000×1000 pixels may be divided into the A pattern region and the B pattern region.

As shown in FIGS. 1 and 2, voltage may be applied to the display control region 10 through the common line 30. Also, voltage may be applied to the viewing angle control region 20 through the common line 30 common to the display control region 10. In this way, it is possible to increase an aperture ratio by sharing the common line 30.

In addition, electrodes may be constructed in a two-layer structure including transparent electrodes in the display control region 10 and the viewing angle control region 20. As a result, it may be possible to increase load capacity without the loss of the aperture ratio. The details of the two-layer structure will be described below in detail with reference to FIGS. 4, 5, and 10.

Hereinafter, the operation of liquid crystal molecules in the viewing angle control region 20 when voltage is or is not applied thereto will be described.

Figure 3A:
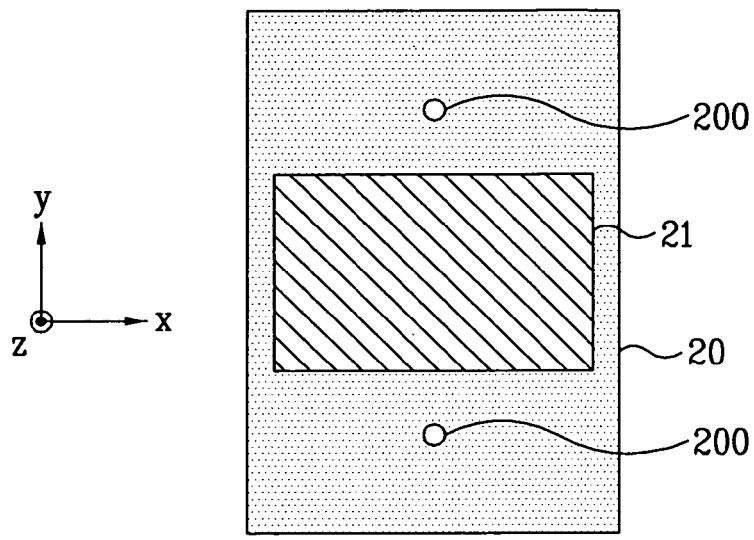
FIGS. 3A and 3B illustrate the operation of liquid crystal molecules in a viewing angle control region having an "A pattern" in the liquid crystal display according to the first embodiment.
Figure 3B:
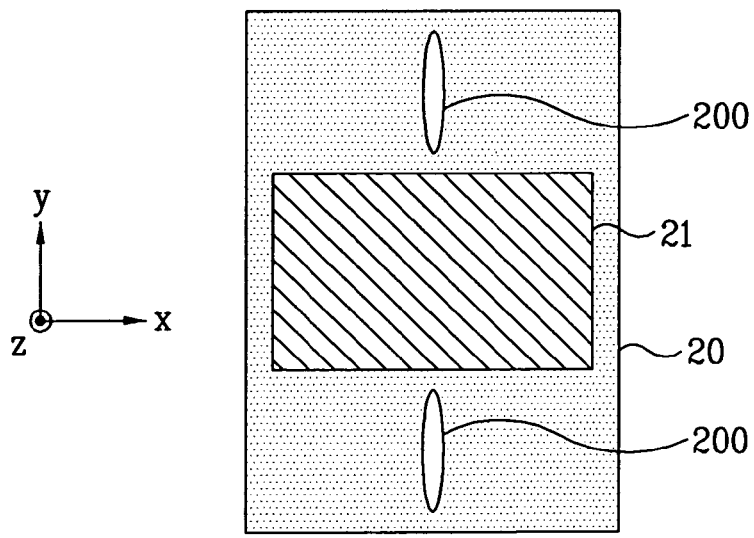

FIGS. 3A and 3B are views illustrating the operation of liquid crystal molecules 200 in the viewing angle control region 20 having the A pattern in the liquid crystal display according to the first embodiment.

When the voltage is not applied to the viewing angle control region 20 having the A pattern, the liquid crystal molecules 200 are erected vertically, that is, in the z-direction, as shown in FIG. 3A. As a result, the display of the viewing angle control region 20 becomes black without affecting the entire display.

This is identical in the front viewing angle (z-direction), the vertical and horizontal (side) viewing angles (y-direction and x-directions, respectively), and the inclined viewing angle. All of the display is normally used.

On the other hand, when voltage is applied to the viewing angle control region 20 having the A pattern, the liquid crystal molecules are inclined in the direction determined by the electric field of the banks 21, i.e., the direction perpendicular to the spreading direction of the banks 21, as shown in FIG. 3B. Consequently, when the viewing angle control region 20 is viewed in the horizontal direction (x-direction), bright light is transmitted through the part having the horizontal banks 21. On the other hand, when the viewing angle control region 20 is viewed in the vertical direction (y-direction), light is not transmitted through the part having the horizontal banks 21.

Figure 3C:
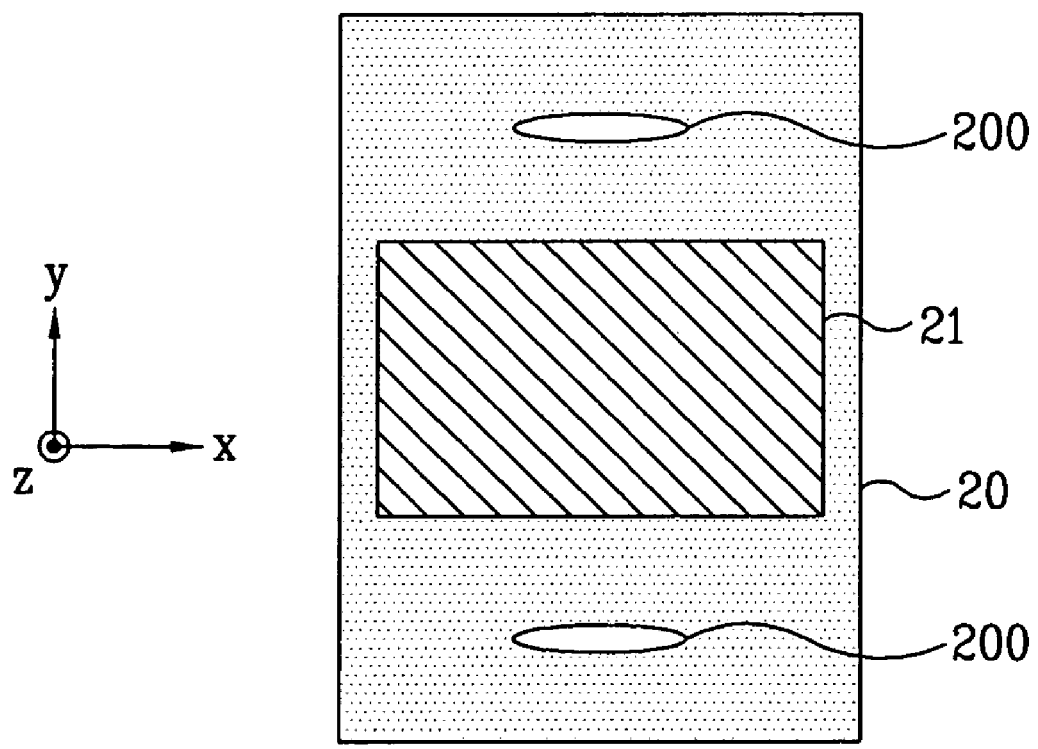
FIG. 3C illustrates the operation of liquid crystal molecules in a viewing control region having a "B pattern" in the liquid crystal display according to the second embodiment.

Meanwhile, when the voltage is applied to the viewing angle control region 20 having the B pattern, the liquid crystal molecules are inclined in a direction differing by 90 degrees from the direction shown in FIG. 3B, as shown in FIG. 3C. Consequently, when the viewing angle control region 20 is viewed only in the horizontal direction (x-direction), light is not transmitted through the part having the vertical banks 21. On the other hand, when the viewing angle control region 20 is viewed in the vertical direction (y-direction), bright light is transmitted through the part having the vertical banks 21.

As a result, when the voltage is applied to the viewing angle control region 20, the viewing angle control region having the A pattern is recognized as white in the horizontal viewing angle, whereas the viewing angle control region having the B pattern is recognized as black in the horizontal viewing angle.

On the other hand, the viewing angle control region having the A pattern is recognized as black in the vertical viewing angle, whereas the viewing angle control region having the B pattern is recognized as white in the vertical viewing angle.

Also, these patterns are overlapped with the common display pattern of the display control region 10. Consequently, when the patterns are viewed in the horizontal direction and the vertical direction (x-direction and y-direction), it is not possible to recognize what is written.

As described above, it is possible to brighten the display in the horizontal field by applying the voltage to the viewing angle control region 20 in the case of the pixels having the A pattern, and it is possible to brighten the display in the vertical field by applying the voltage to the viewing angle control region 20 in the case of the pixels having the B pattern.

Consequently, it may be possible to produce a display having the desired confidentiality by disposing the A pattern region and the B pattern region at desired positions in the display screen.

Hereinafter, a process for manufacturing the viewing angle control region 20 will be described.

Figure 4:
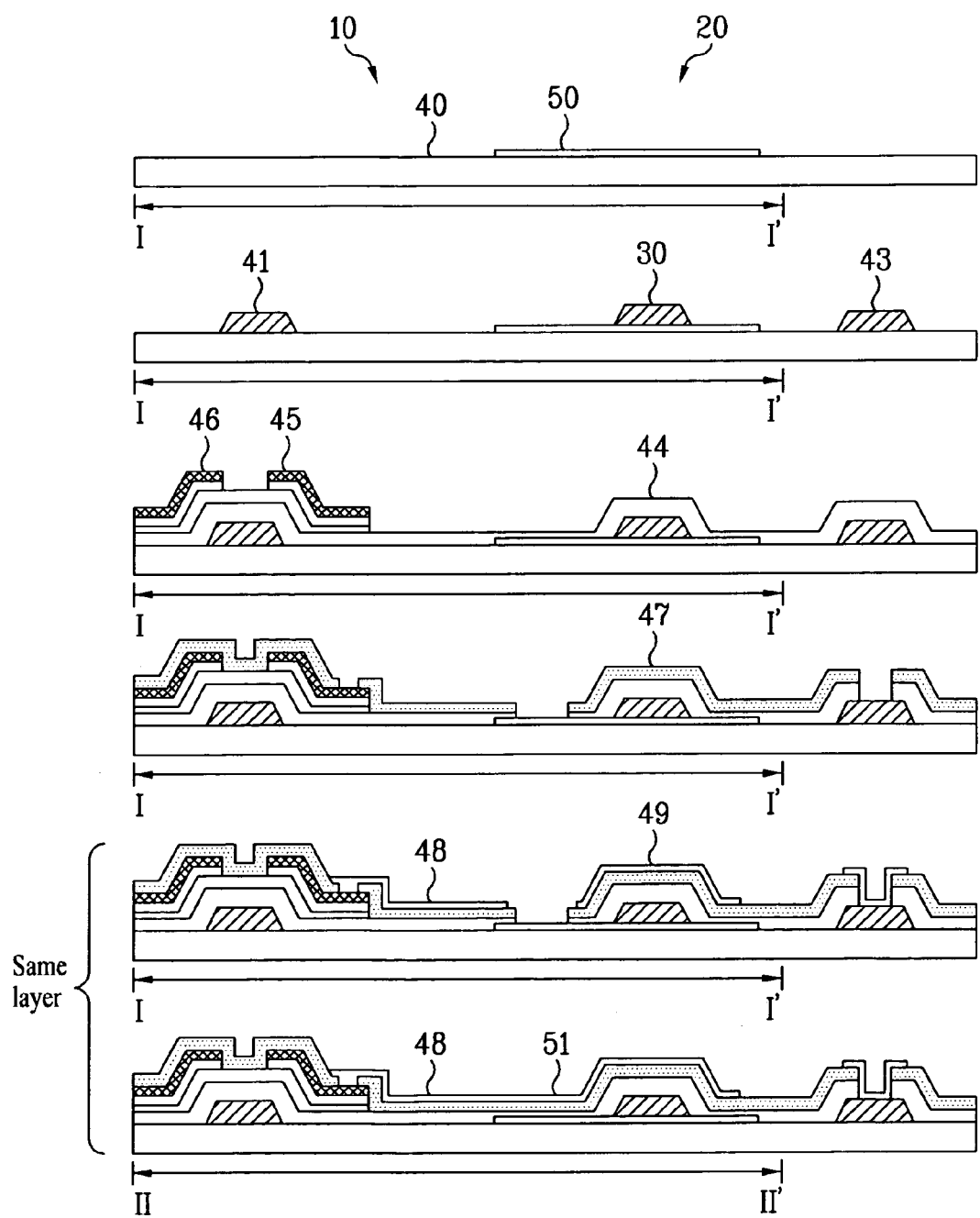
FIG. 4 illustrates a method of manufacturing the liquid crystal display according to the first embodiment.

FIG. 4 is a view illustrating a method of manufacturing the liquid crystal display according to the first embodiment.

First, according to a first operation, a one-layer transparent electrode 50 is formed on a lower substrate 40.

Subsequently, according to a second operation, a gate electrode 41 and a data pad 43 are formed on the substrate 40, and a common line 30 is formed on the transparent electrode 50.

Subsequently, according to a third operation, a gate insulation film 44 is formed, and then an amorphous silicon (a-Si) layer and a doped amorphous silicon (N+ a-Si) layer are sequentially formed. On the N+ a-Si layer is formed a metal layer, and holes are formed by etching. On the gate electrode 41 are formed a source electrode 46 and a drain electrode 45.

Subsequently, according to a fourth operation, a passivation layer 47 is formed on the front of the substrate 40, and then contact holes are formed.

Subsequently, according to a fifth operation, a pixel electrode 48 is formed in a display control region 10, in which an alignment of the liquid crystal molecules is controlled such that the liquid crystal molecules are disposed in an inclined orientation, and a viewing angle control electrode 49 is further formed in a viewing angle control region 20, in which the alignment of the liquid crystal molecules is controlled such that the liquid crystal molecules are disposed in the vertical orientation (y-direction) and in the horizontal orientation (x-direction), and control voltage is applied through the common line 30 common to the display control region 10. At this time, the passivation layer 47 and the pixel electrode 48 are removed from the viewing angle control region 20.

In the fifth operation, a load capacity 51 is also formed depending upon the position of a mask. As a result of this process, the structure as shown in FIG. 1 or FIG. 2 is finally formed.

The manufacturing process described herein is different from the conventional 4 mask-based manufacturing process in that the transparent electrode 50 is formed in the first operation, and the viewing angle control electrode 49 is formed in addition to the pixel electrode 48 in the final operation.

It is possible to construct the two-layer structure based on the transparent electrode by adding the first process. Also, it is possible to fill the viewing angle control region 20 by the provision of a mask in the fourth operation, without adding a mask process.

Figure 5:
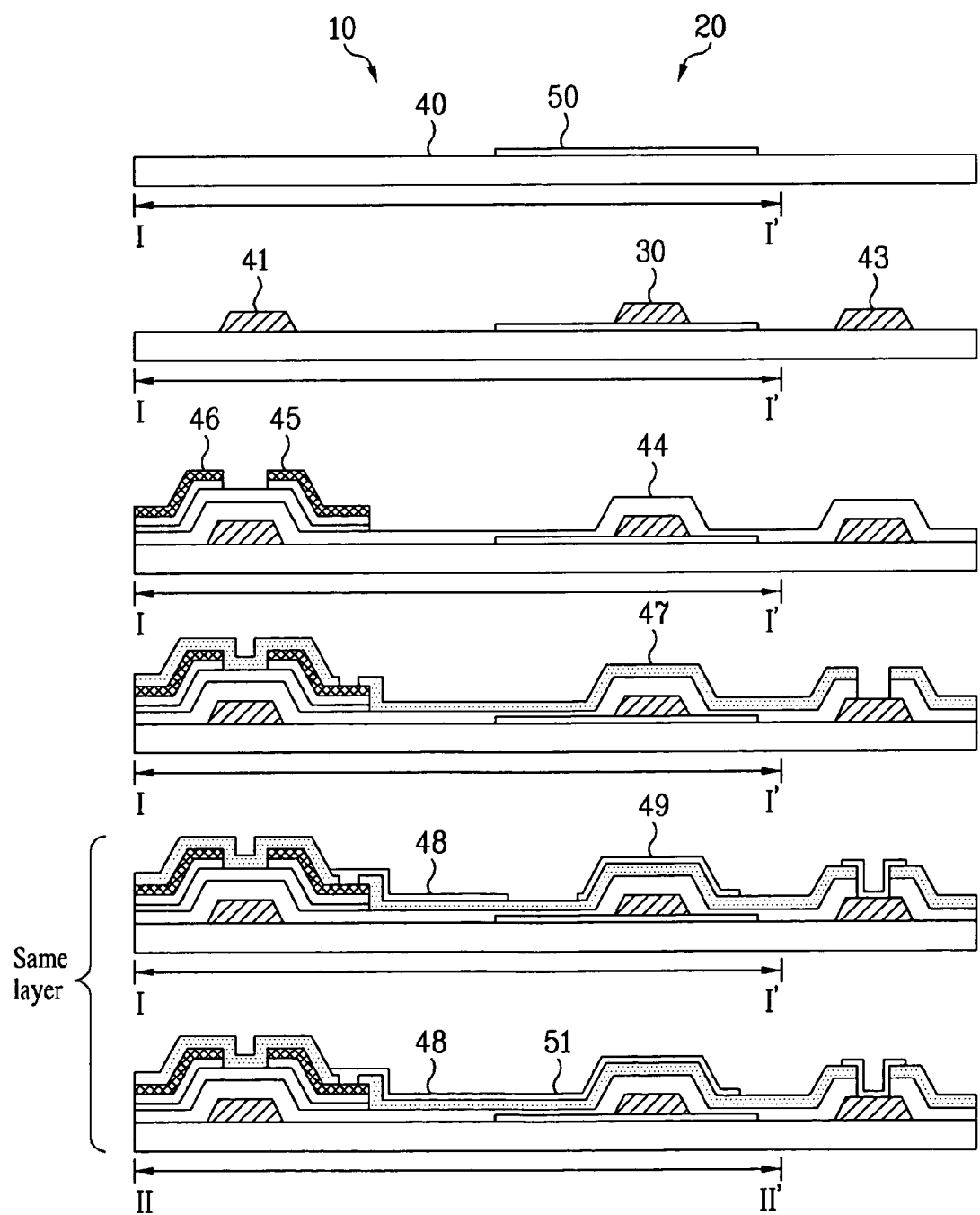
FIG. 5 illustrates another method of manufacturing the liquid crystal display according to the first embodiment.

FIG. 5 is a view illustrating another method of manufacturing the liquid crystal display according to the first embodiment.

First, according to a first operation, a one-layer transparent electrode 50 is formed on a substrate 40.

Subsequently, according to a second operation, a gate electrode 41 and a data pad 43 are formed on the substrate 40, and a common line 30 is formed on the transparent electrode 50.

Subsequently, according to a third operation, a gate insulation film 44 is formed, and then an a-Si layer and an N+ a-Si layer are sequentially formed. On the N+ a-Si layer is formed a metal layer, and holes are formed by etching. On the gate electrode 41 are formed a source electrode 46 and a drain electrode 45.

Subsequently, according to a fourth operation, a passivation layer 47 is formed on the front of the substrate 40, and then contact holes are formed.

Subsequently, according to a fifth operation, a pixel electrode 48 is formed in a display control region 10, in which alignment of liquid crystal molecules is controlled such that the liquid crystal molecules are oriented in the inclined orientation, and a viewing angle control electrode 49 is further formed in a viewing angle control region 20, in which the alignment of liquid crystal molecules is controlled such that the liquid crystal molecules are disposed in the vertical orientation and in the horizontal orientation, and control voltage is applied through the common line 30 common to the display control region 10.

In the case of the above-described manufacturing method shown in FIG. 4, the passivation layer 47 and the pixel electrode 48 are removed from the viewing angle control region 20. In the case of the manufacturing method shown in FIG. 5, however, the passivation layer 47 is not removed from the viewing angle control region 20, but only the pixel electrode 48 is removed from the viewing angle control region 20.

In the fifth operation, a load electrode 51 is also formed depending upon the position of a mask. A load capacity is formed such that the load electrode 51 connected to pixel electrode 48 is overlapped with the transparent electrode 50 connected to the common line 30. The gate insulation film 44 and passivation layer 47 are interposed between the load electrode 51 and the transparent electrode 50. As a result of this process, the structure as shown in FIG. 1 or FIG. 2 is finally formed.

According to the present disclosure, the transparent electrode has the two-layer structure including the gate metal, and therefore, it is possible to freely change the size of the load capacity.

Figure 6:
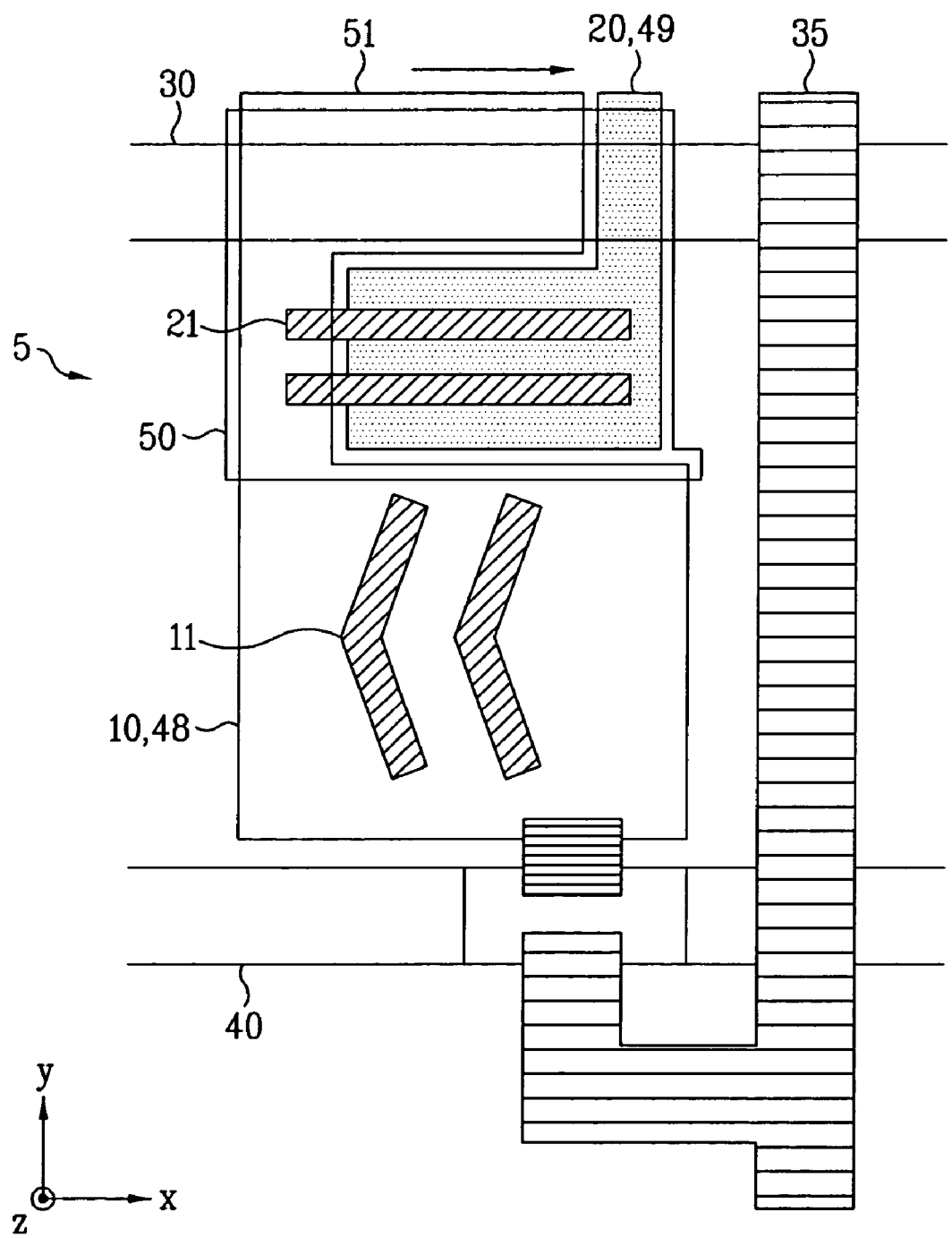
FIG. 6 is a plan view illustrating the enlarged pixel of the liquid crystal display according to the first embodiment.

FIG. 6 is another plan view illustrating the enlarged pixel 5 of the liquid crystal display according to the first embodiment. As indicated by an arrow in FIG. 6, it is possible to change the size of the load capacity.

Hereinafter, a method of controlling a display control region 10 and a viewing angle control region 20 formed in one pixel 5 will be described.

Figure 7:
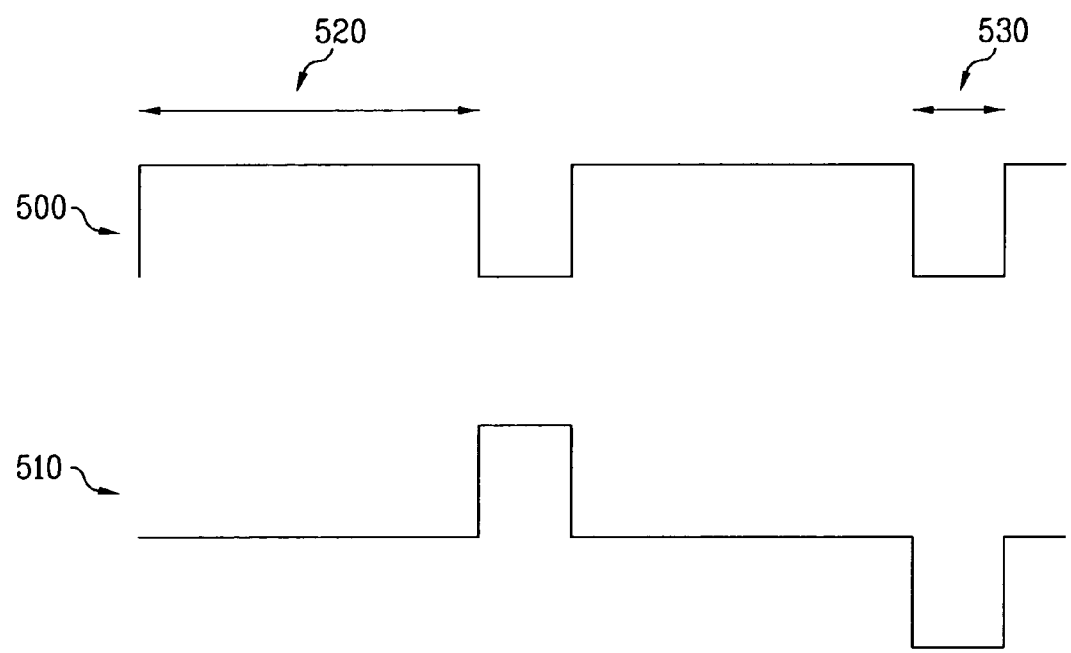
FIG. 7 illustrates the waveform of applied voltage in the liquid crystal display according to the first embodiment.

FIG. 7 is a view illustrating a waveform of applied voltage in the liquid crystal display according to the first embodiment.

First, as shown in FIGS. 1 and 2, a control voltage 500, 510 is applied to the display control region 10 and the viewing angle control region 20 through the common line 30.

When common voltage is applied during the voltage writing of the pixel, pixel voltage is lowered. For this reason, the application of voltage 510 to the viewing angle control region 20 is performed not during the writing 520 of the pixel but during the blanking 530 of the pixel.

By controlling the timing of the applied voltage as described above, it is possible to individually control the voltage 500 applied to the display control region 10 and the voltage 510 applied to the viewing angle control region 20 while jointly using the common line 30.

Also, the viewing angle control region 20 does not directly contribute to the display. The viewing angle control region 20 is provided such that it is difficult to recognize the display information. Consequently, it is not necessary to form a coloring layer at a color filter substrate side opposite to the viewing angle control region 20.

According to the first embodiment as described above, it may be possible to provide a liquid crystal display having a viewing angle that can be controlled in at least one direction perpendicular to the front (the viewing direction) of the display. For example, the viewing angle may be controlled in the y-direction and the z-direction by forming the viewing angle control region having the two-layer structure based on the transparent electrode through the addition of the operation of forming the transparent electrode.

Furthermore, it may be possible to increase an aperture ratio by sharing the common line common to the display control region and the viewing angle control region, and it is possible to independently control the viewing angle control region in consideration of the timing of voltage applied to the respective regions.

Also, it may be possible to increase the load capacity without the loss of the aperture ratio by constructing the two-layer structure based on the transparent electrode, and therefore, it is possible to increase the degree of freedom in design.

Furthermore, it may be possible to realize a liquid crystal display having the desired confidentiality over the entire liquid crystal panel by disposing the viewing angle control pattern in the x- and y-directions at a desired position in the display screen. In addition, it is not necessary to form the coloring layer at the color filter substrate opposite to the viewing angle control region, and therefore, it is possible to reduce the manufacturing costs.

Hereinafter, another method of manufacturing a liquid crystal display according to a second embodiment, which has a two-layer structure based on a transparent electrode, using a 5 mask process will be described.

Figure 8:
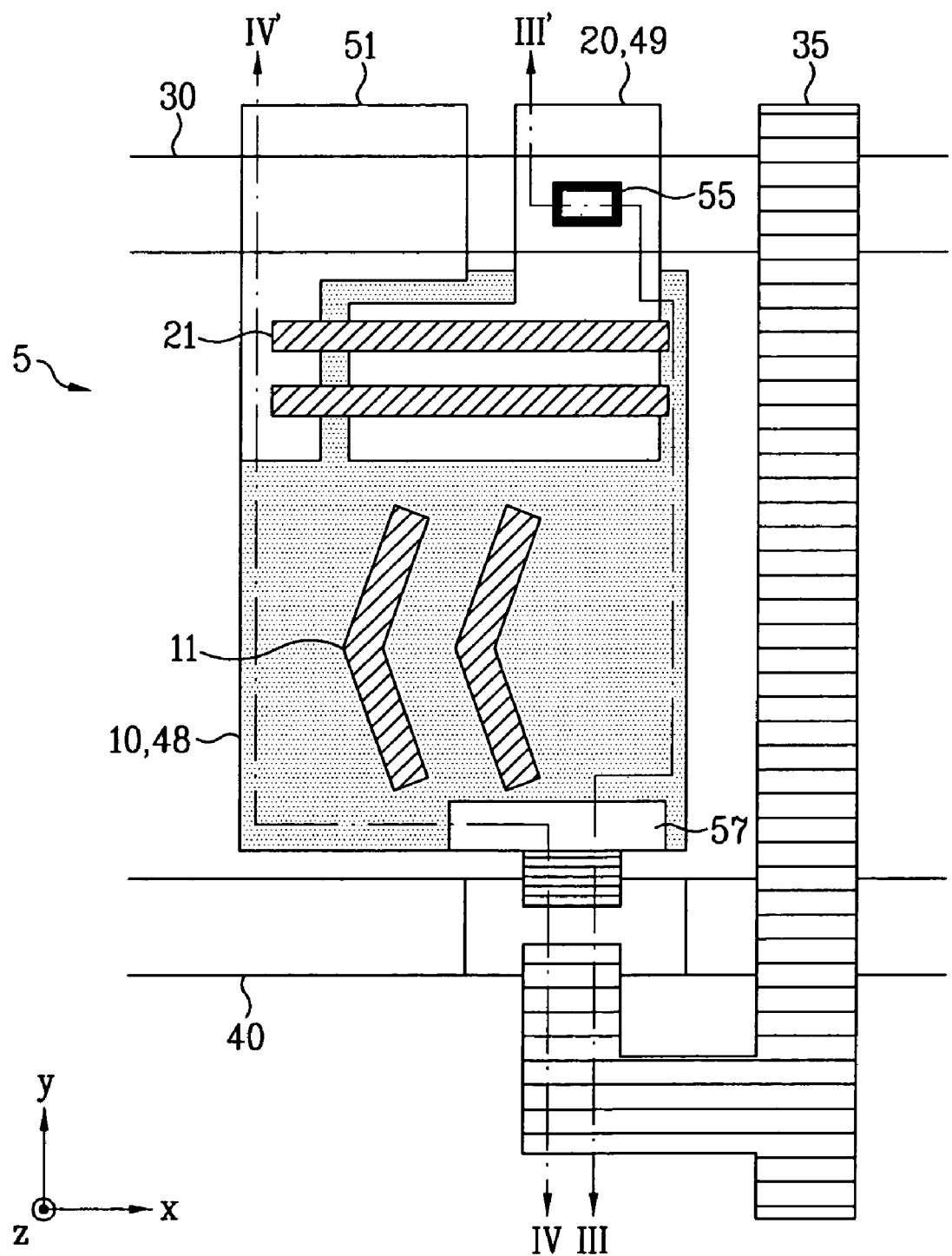
FIG. 8 is a plan view illustrating an enlarged pixel of a liquid crystal display according to a second embodiment.

FIG. 8 is a plan view illustrating an enlarged pixel 5 of a liquid crystal display according to a second embodiment. As shown in FIG. 8, banks (or slits) 21 are formed in the horizontal orientation (x-direction).

Figure 9:
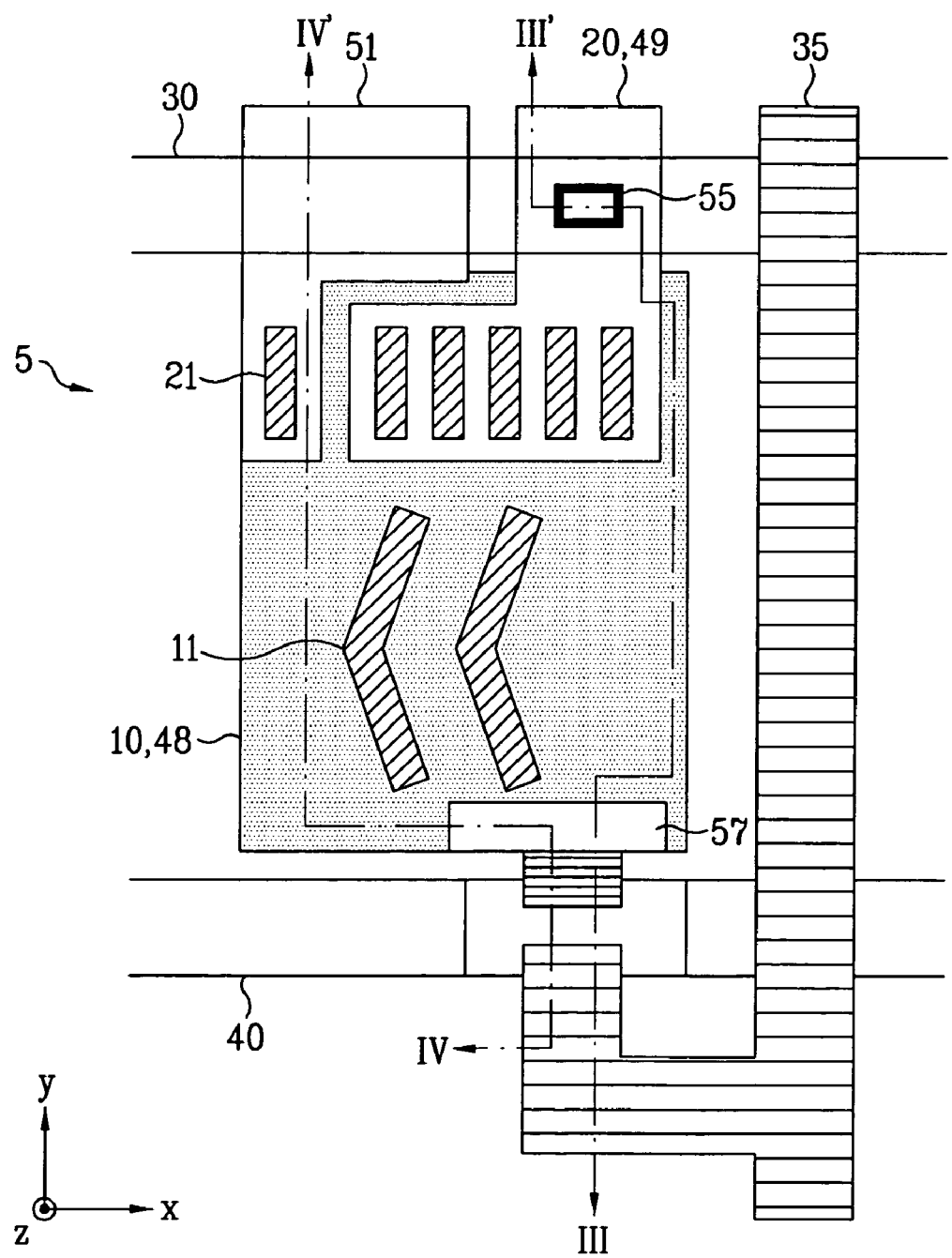
FIG. 9 is another plan view illustrating the enlarged pixel of the liquid crystal display according to the second embodiment.

FIG. 9 is another plan view illustrating the enlarged pixel 5 of the liquid crystal display according to the second embodiment. As shown in FIG. 9, the banks (or slits) 21 are formed in the vertical orientation (y-direction)

The constructions of FIGS. 8 and 9 are different from those of FIGS. 1 and 2 in that a contact hole 55 is formed in the viewing angle control region 20. However, the constructions of FIGS. 8 and 9 are identical to those of FIGS. 1 and 2 in that the two-layer structure is constructed based on the transparent electrode, and therefore, the second embodiment provides the same effect as the first embodiment.

Hereinafter, a process for manufacturing the viewing angle control region will be described.

Figure 10:
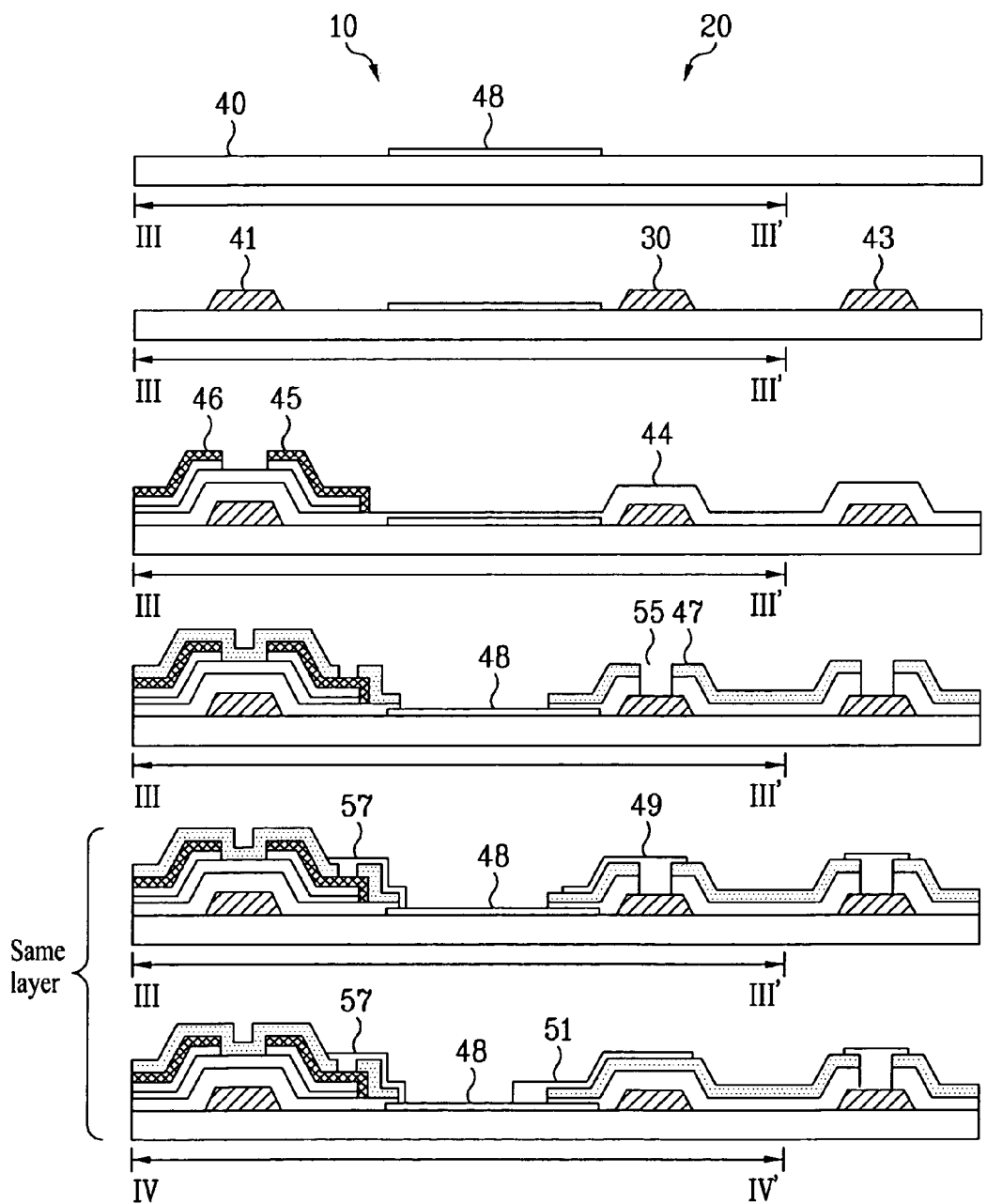
FIG. 10 illustrates a method of manufacturing the liquid crystal display according to the second embodiment.
Figure 11A:
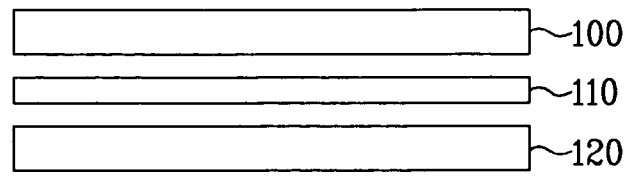
FIGS. 11A-11C illustrate a conventional liquid crystal display having a secret mode.
Figure 11B:
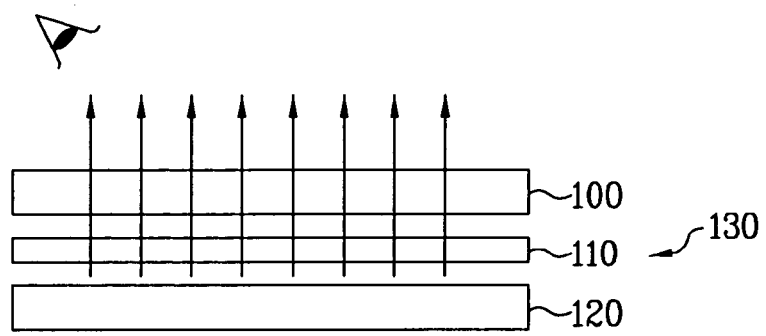
Figure 11C:
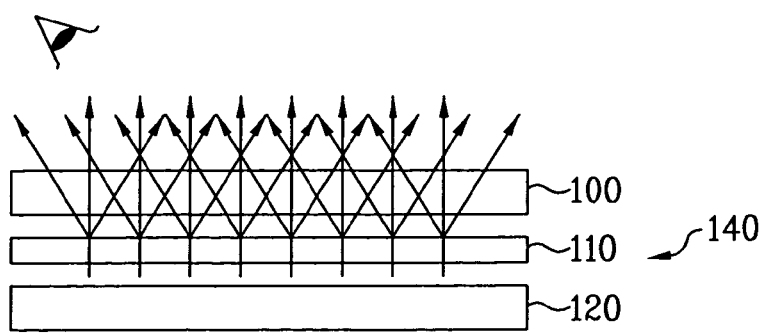
Figure 12A:
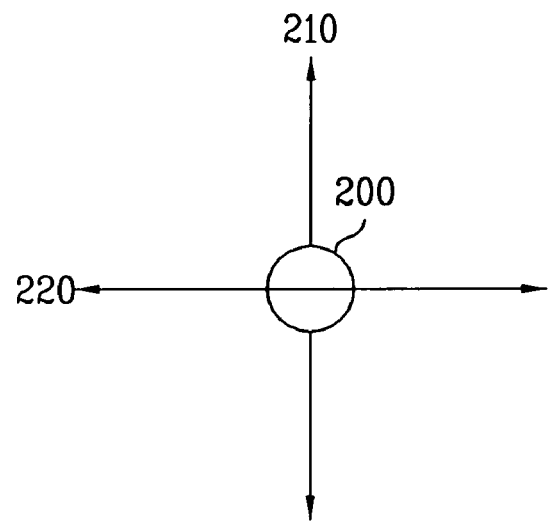
FIGS. 12A and 12B illustrate the shape of a liquid crystal molecule when viewing a vertical alignment type liquid crystal display from the front.
Figure 12B:
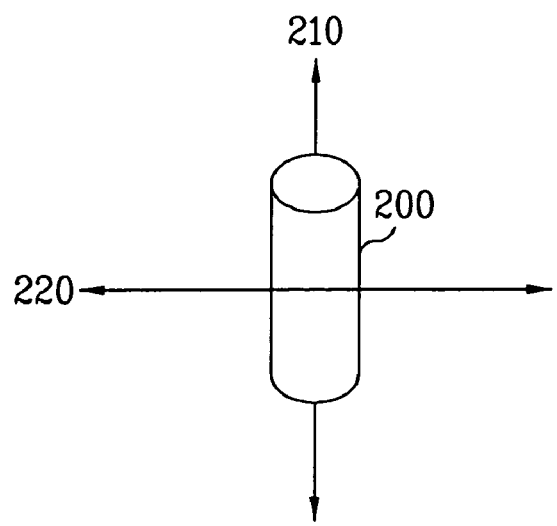
Figure 13A:
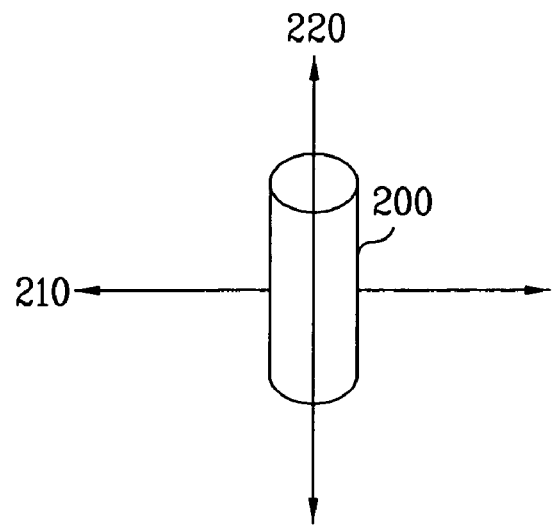
FIGS. 13A and 13B illustrate the shape of a liquid crystal molecule when viewing the vertical alignment type liquid crystal display from the side at an angle to the front of the liquid crystal display.
Figure 13B:
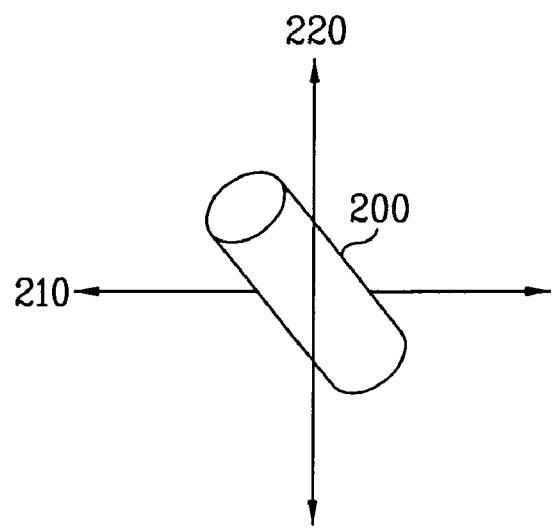
Figure 14:
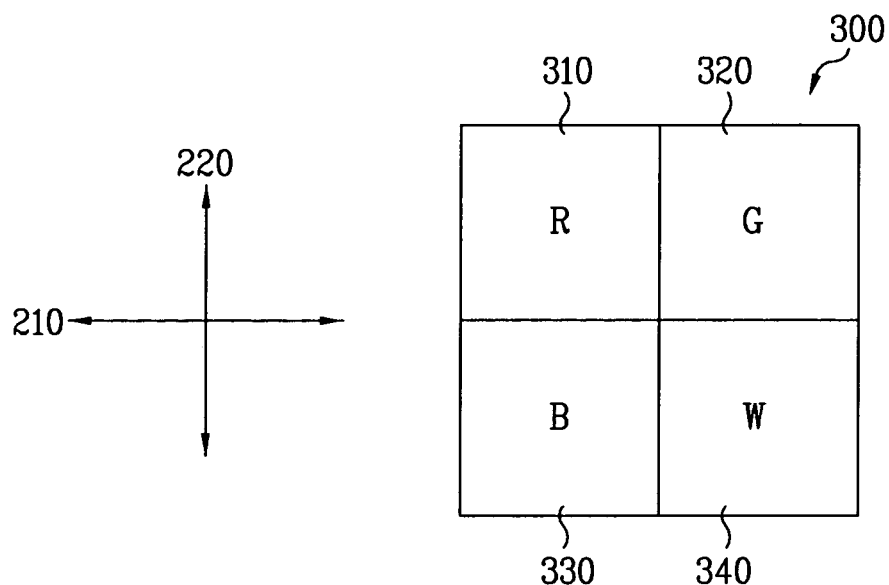
FIG. 14 illustrates the specific construction for controlling the confidentiality of the display.
Figure 15:
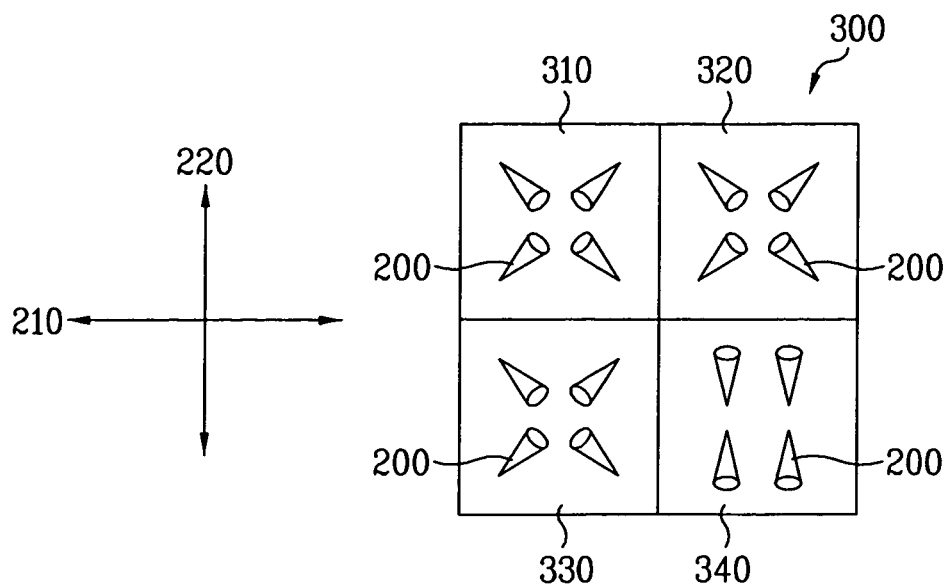
FIG. 15 illustrates the arrangement of liquid crystal molecules of the respective sub-pixels shown in FIG. 14.
Figure 16:
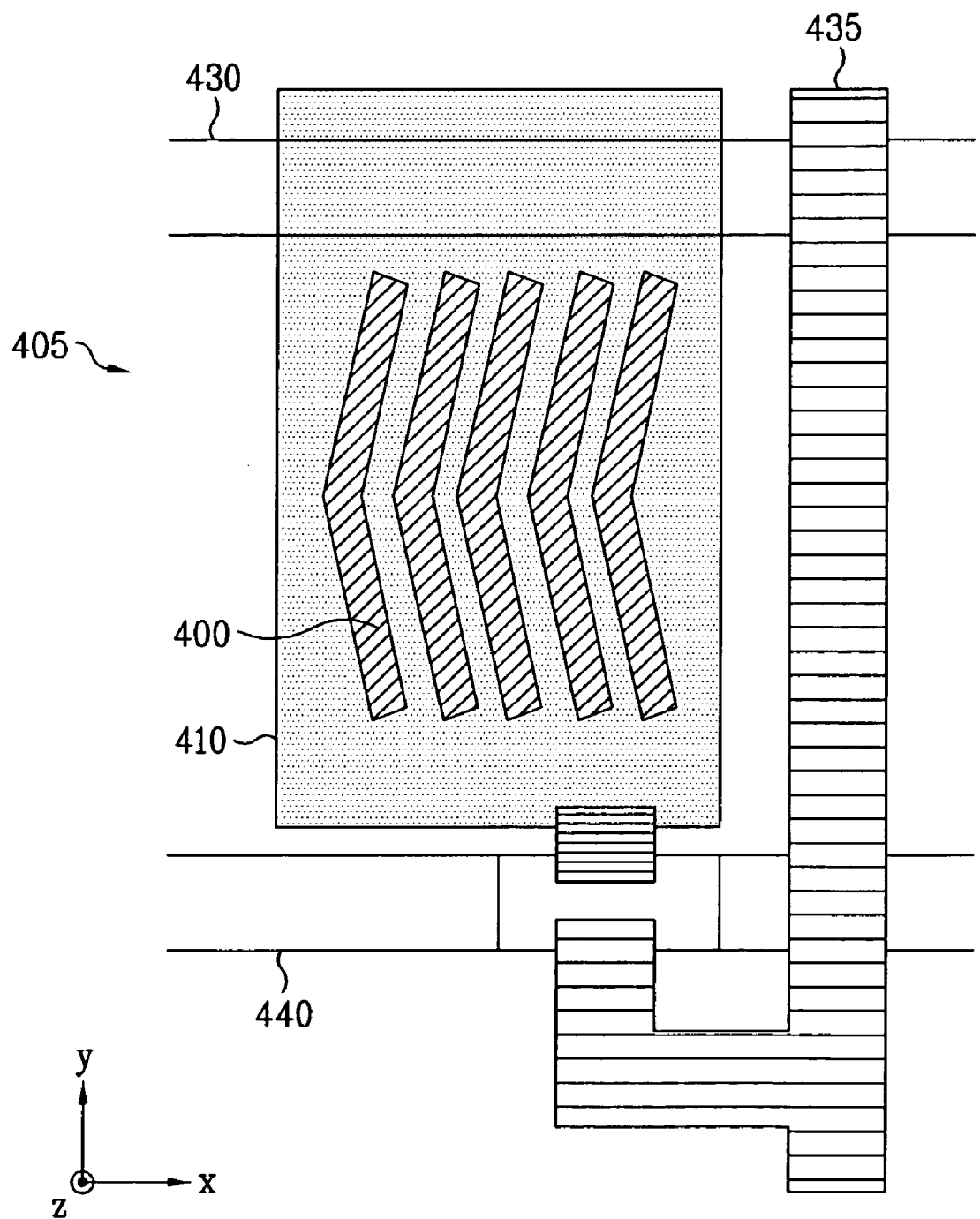
FIG. 16 is a plan view illustrating an enlarged pixel of a conventional vertical alignment type liquid crystal display.
Figure 17:
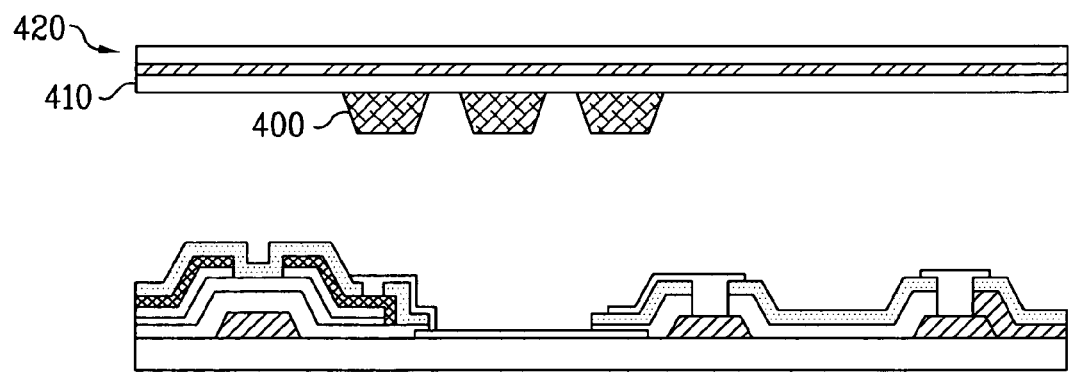
FIG. 17 is a sectional view illustrating the enlarged pixel of the conventional vertical alignment type liquid crystal display.
Figure 18A:
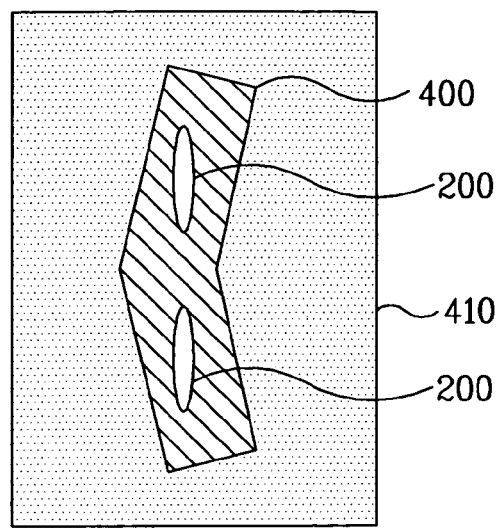
FIGS. 18A and 18B illustrate the operation of liquid crystal molecules due to the application of voltage in the conventional vertical alignment type liquid crystal display.
Figure 18B:
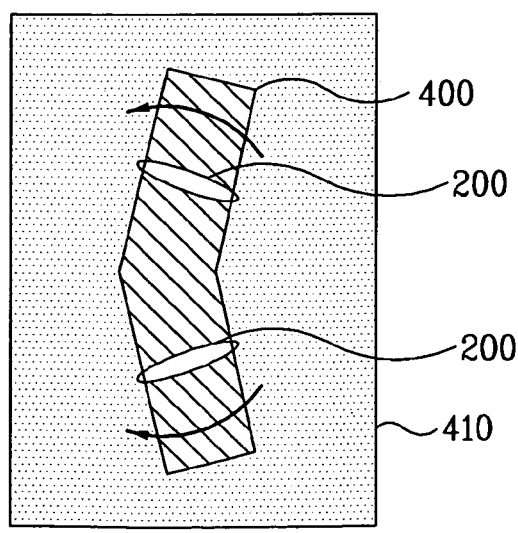

FIG. 10 is a view illustrating a method of manufacturing the liquid crystal display according to the second embodiment.

First, according to a first process, a pixel electrode 50 is formed on a lower substrate 40.

Subsequently, according to a second process, a gate electrode 41, a common line 30, and a data pad 43 are formed on the substrate 40.

Subsequently, according to a third process, a gate insulation film 44 is formed, and then an a-Si layer and an N+ a-Si layer are sequentially formed. A metal layer is formed on the N+ a-Si layer, and holes are formed by etching. A source electrode 46 and a drain electrode 45 are formed on the gate electrode 41.

Subsequently, according to a fourth process, a passivation layer 47 is formed on the front of the substrate 40, and then contact holes 55 are formed. After that, the passivation layer 47 and the gate insulation film 44 are removed from the display control region 10 so as to exposure the pixel electrode 48.

Finally, according to a fifth process, a bridge electrode 57 is formed on the channel and display control region 10, and a load electrode 51 is formed on the viewing angle control region 20.

In the fifth operation, a viewing angle control electrode 49 is further formed in a viewing angle control region 20, in which an alignment of liquid crystal molecules is controlled such that the liquid crystal molecules are disposed in the vertical orientation (y-direction) and in the horizontal orientation (x-direction), and control voltage is applied through the common line 30 common to the display control region 10.

In the fifth process, a load capacity is also formed depending upon the position of a mask. The load capacity is formed such that the load electrode 51 is overlapped with the common line 30. The gate insulation film 44 and passivation layer 47 are interposed between the load electrode 51 and the common line 30. As a result of this process, the structure as shown in FIG. 8 or FIG. 9 is finally formed.

When the above-described manufacturing process is used, it is possible to construct the two-layer structure based on the transparent electrode by adding the first operation.

Also, it is possible to fill the viewing angle control region 20 by the provision of a mask in the fourth and fifth operations without adding a mask process.

According to the second embodiment as described above, it is possible to provide a liquid crystal display having a viewing angle that can be controlled in the vertical direction and the horizontal direction by forming the viewing angle control region having the two-layer structure based on the transparent electrode through the addition of the operation of forming the transparent electrode.

Furthermore, it may be possible to increase an aperture ratio by sharing the common line common to the display control region and the viewing angle control region, and it may be possible to independently control the viewing angle control region in consideration of the timing of voltage applied to the respective regions.

Also, it may be possible to increase the load capacity without the loss of the aperture ratio by constructing the two-layer structure based on the transparent electrode, and therefore, it is possible to increase the degree of freedom in design.

Furthermore, it may be possible to realize a liquid crystal display having desired confidentiality over the entire liquid crystal panel by disposing the viewing angle control pattern in the vertical and horizontal direction at a desired position in the display screen.

In addition, it is not necessary to form the coloring layer at the color filter substrate opposite to the viewing angle control region, and therefore, it may be possible to reduce the manufacturing costs.

According to the present disclosure, it is possible to provide a liquid crystal display having a viewing angle which is controllable in side directions parallel to the display screen without forming a white sub-pixel by forming in one pixel a display control region, in which the alignment of the liquid crystal molecules is controlled such that the liquid crystal molecules are disposed in the inclined orientation, and by further forming in the pixel a viewing angle control region, in which the alignment of the liquid crystal molecules is controlled such that the liquid crystal molecules are disposed either in a first side orientation or in a second side orientation. Also, the control voltage is applied through the common line common to the display control region, such that the two-layer structure is constructed based on the transparent electrode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vertical alignment type liquid crystal display having a display screen including a plurality of pixels, each pixel comprising:

a display control region including a pixel electrode in which an alignment of liquid crystal molecules is controlled such that the liquid crystal molecules are disposed in an inclined orientation with respect to the display screen when a control voltage is applied;

a viewing angle control region including a viewing angle control electrode in which the alignment of liquid crystal molecules is controlled such that the liquid crystal molecules are oriented in a first side orientation parallel to the display screen or in a second side orientation parallel to the display screen when the control voltage is applied; and a transparent electrode formed in the display control region and the viewing angle control region, wherein the control voltage is applied to the transparent electrode formed in the display control region and the viewing angle control region through a common line.

2. The liquid crystal display according to claim 1, wherein the first side orientation is parallel to the common line, and the second side orientation is perpendicular to the common line.

3. The liquid crystal display according to claim 1, wherein the pixel electrode and the viewing angle control electrode comprise a two-layer structure based on the transparent electrode.

4. The liquid crystal display according to claim 1, wherein the control voltage is applied to the viewing angle control region through the common line during a pixel blanking operation.

5. The liquid crystal display according to claim 1, wherein a coloring layer of a color filter is not disposed on a substrate opposite to the viewing angle control region.

6. A vertical alignment type liquid crystal display having a display screen including a plurality of pixels, each pixel comprising:

a display control region including a pixel electrode and a plurality of "<"-shaped banks or slits;

a viewing angle control region including a viewing angle control electrode and a plurality of rectangular banks or slits disposed in one of a direction parallel to a common line and a direction perpendicular to the common line; and a transparent electrode formed in the display control region and the viewing angle control region, wherein a control voltage is applied to the transparent electrode formed in the display control region and the viewing angle control region through the common line.

7. The liquid crystal display according to claim 6, wherein the pixel electrode and the viewing angle control electrode comprise a two-layer structure based on a transparent electrode.

8. The liquid crystal display according to claim 6, wherein the control voltage is applied to the viewing angle control region through the common line during a pixel blanking operation.

9. The liquid crystal display according to claim 6, wherein a coloring layer of a color filter is not disposed on a substrate opposite to the viewing angle control region.

* * * * *